(12) United States Patent
Larose et al.

(10) Patent No.: US 11,821,471 B2
(45) Date of Patent: Nov. 21, 2023

(54) PROGRAMMABLE MAGNETORHEOLOGICAL FLUID CLUTCH APPARATUS

(71) Applicant: EXONETIK INC., Sherbrooke (CA)

(72) Inventors: Pascal Larose, Sherbrooke (CA); Patrick Chouinard, Sherbrooke (CA); Marc Denninger, Sherbrooke (CA)

(73) Assignee: EXONETIK INC., Sherbrooke (CA)

( * ) Notice: Subject to any disclaimer, the term of this patent is extended or adjusted under 35 U.S.C. 154(b) by 0 days.

(21) Appl. No.: 17/772,003

(22) PCT Filed: Nov. 12, 2020

(86) PCT No.: PCT/CA2020/051529
§ 371 (c)(1),
(2) Date: Apr. 26, 2022

(87) PCT Pub. No.: WO2021/092683
PCT Pub. Date: May 20, 2021

(65) Prior Publication Data
US 2022/0389976 A1 Dec. 8, 2022

Related U.S. Application Data

(60) Provisional application No. 62/934,219, filed on Nov. 12, 2019.

(51) Int. Cl.
*F16D 37/02* (2006.01)
*E05F 15/611* (2015.01)
*F16D 37/00* (2006.01)

(52) U.S. Cl.
CPC ............. *F16D 37/02* (2013.01); *E05F 15/611* (2015.01); *E05Y 2201/216* (2013.01); *E05Y 2201/246* (2013.01); *E05Y 2900/531* (2013.01); *F16D 2037/004* (2013.01); *F16D 2200/003* (2013.01)

(58) Field of Classification Search
CPC ............... F16D 37/02; F16D 2037/004; F16D 2200/003; E05Y 2201/246; E05Y 2900/531
See application file for complete search history.

(56) References Cited

U.S. PATENT DOCUMENTS

| 4,739,864 A * | 4/1988 | Numazawa ............. F16D 37/02 192/3.56 |
| 2003/0136626 A1* | 7/2003 | Ciaramitaro ............ F16D 37/02 192/57 |
| 2010/0019514 A1 | 1/2010 | Steinwender |

(Continued)

*Primary Examiner* — David R Morris
(74) *Attorney, Agent, or Firm* — NORTON ROSE FULBRIGHT CANADA LLP

(57) ABSTRACT

A system for operating at least one magnetorheological fluid clutch apparatus may, in a first mode, vary an amount of torque transmission between a driving member and a driven member in the at least one magnetorheological fluid clutch apparatus by actuating at least one coil in the at least one magnetorheological fluid clutch apparatus. In a second mode, the system may cause torque transmission between the driven member and the driving member by setting a desired remanent magnetization level in a magnetic component of the at least one magnetorheological fluid clutch apparatus by actuating the at least one coil in the at least one magnetorheological fluid clutch apparatus.

20 Claims, 15 Drawing Sheets

(56) References Cited

U.S. PATENT DOCUMENTS

| | | | |
|---|---|---|---|
| 2011/0127133 A1* | 6/2011 | Ogawa | F16D 37/02 |
| | | | 192/21.5 |
| 2012/0085613 A1* | 4/2012 | Bose | H02K 7/14 |
| | | | 192/21.5 |
| 2018/0156285 A1 | 6/2018 | Plante et al. | |
| 2018/0370591 A1 | 12/2018 | Denninger et al. | |
| 2019/0257372 A1 | 8/2019 | Plante et al. | |

* cited by examiner

PROGRAMMABLE MAGNETORHEOLOGICAL FLUID CLUTCH APPARATUS

TECHNICAL FIELD

The present application relates generally to magnetorheological (MR) fluid clutch apparatuses and an operation of such MR fluid clutch apparatuses.

BACKGROUND OF THE ART

Magnetorheological (MR) fluid clutch apparatuses are known as useful apparatuses for transmitting motion/forces from a drive shaft, at a variable degree and with precision and accuracy, among other advantages. Accordingly, an increasing number of applications consider the use of MR fluid clutch apparatuses. In a known configuration, the MR fluid clutch apparatus has drums on both the input and the output, with MR fluid located in the annular gaps between the shear surfaces of drums of the input and output. To magnetize the MR fluid located in the annular gaps, a magnetic field passes through the drums, which are known to use materials with high permeability. Steel, for example, is commonly used as material for the drums of MR fluid clutch apparatuses.

There are, in some application, constraint to maintain torque in the MR fluid clutch apparatus without power. State of the art MR fluid clutch apparatuses with a magnet in the magnetic circuit are able to maintain a fixed torque value when the MR fluid clutch apparatus is not powered as for example shown in PCT Application Publication No. WO 2016168934. In such MR fluid clutch apparatuses, the output starts slipping if the torque applied is larger than the fixed design torque that correspond to the magnetic field maintained in the MR fluid shear interface by the magnetizable component. In this type of MR fluid clutch apparatus, instead of creating a magnetic field in the MR fluid shear interfaces, the coil of the MR fluid apparatus will re-direct the magnetic flux of the magnetizable component installed in parallel into a re-direction gap. The control of the magnetic flux in the MR fluid shear interfaces may be controlled with high bandwidth. When the power is removed from the coil, the magnetizable component may return to its state where it creates a magnetic field in the MR fluid shear area and the MR fluid clutch apparatus returns to a state where it provides its fixed design torque without power.

In some of applications where the required slipping torque varies as a function of the condition of operation, like a vehicle door parked at different inclines, the powertrain of a vehicle or an equipment operating in various conditions (e.g. asphalt, sand, ice, . . . ), the moving part of an equipment requiring various torque in function of the application (e.g. a CNC machining center where the torque varies in relation to the diameter of the part) or any other application where a programmable clutch could benefit and where the configuration of the prior art may limit the functionality, a new solution is desirable.

SUMMARY

It is an aim of the present disclosure to provide magnetorheological (MR) fluid clutch apparatuses that addresses issues associated with the prior art.

Therefore, in accordance with a first aspect of the present disclosure, there is provided a magnetorheological fluid clutch apparatus comprising: a driving member having at least one first shear surface, the driving member adapted to be coupled to a torque source; a driven member having at least one second shear surface opposite to the at least one first shear surface, the shear surfaces separated by at least one annular space, the driven member adapted to be connected to an output; magnetorheological (MR) fluid in an MR fluid chamber including the at least one annular space, the MR fluid configured to generate a variable amount of torque transmission between the driving member and the driven member when subjected to a magnetic field; at least one coil actuatable to deliver a magnetic field through the MR fluid; and at least one magnetizable component of the type maintaining a remanent magnetization level, the magnetizable component configured to be exposed to the magnetic field from the at least one coil to achieve remanent magnetization; wherein actuation of the at least one coil results in a variation of torque transmission between the driven member and the driving member, and wherein the remanent magnetization level generates another magnetic field resulting in torque transmission between the driven member and the driving member.

Further in accordance with the first aspect, for instance, the driving member and the driven member are rotatably connected a stator.

Still further in accordance with the first aspect, for instance, the torque source is a motor.

Still further in accordance with the first aspect, for instance, the torque source is a structure providing braking power.

Still further in accordance with the first aspect, for instance, the at least one magnetization component is annular.

Still further in accordance with the first aspect, for instance, the at least one magnetization component includes a plurality of discrete magnetization components circumferentially distributed in the magnetorheological fluid clutch apparatus.

Still further in accordance with the first aspect, for instance, the at least one magnetization component is axisymmetric.

Still further in accordance with the first aspect, for instance, the at least one first shear surface is part of an input drum, and the at least one second shear surface is part of an output drum.

Still further in accordance with the first aspect, for instance, the magnetizable component is made of AlNiCo.

Still further in accordance with the first aspect, for instance, there is provided a system comprising: at least one magnetorheological fluid clutch apparatus according to as described above, and a controller for operating the at least one coil.

Still further in accordance with the first aspect, for instance, the torque is a motor, the system including the motor.

Still further in accordance with the first aspect, for instance, the at least one magnetorheological fluid clutch apparatus is operatively connected to a door.

In accordance with a second aspect of the present disclosure, there is provided a system for operating at least one magnetorheological fluid clutch apparatus comprising: a processing unit; and a non-transitory computer-readable memory communicatively coupled to the processing unit and comprising computer-readable program instructions executable by the processing unit for: in a first mode, varying an amount of torque transmission between a driving member and a driven member in the at least one magnetorheological fluid clutch apparatus by actuating at least one coil in the at least one magnetorheological fluid clutch apparatus, and in a second mode, causing torque transmission between the driven member and the driving member by setting a desired remanent magnetization level in a magnetic component of the at least one magnetorheological fluid clutch apparatus by actuating the at least one coil in the at least one magnetorheological fluid clutch apparatus.

Further in accordance with the second aspect, for instance, a torque source connected to the driving member in the second mode is decelerated.

Still further in accordance with the second aspect, for instance, the torque source connected to the driving member in the second mode is stopped.

Still further in accordance with the second aspect, for instance, in a third mode, an amount of torque transmission between the driving member and the driven member in the at least one magnetorheological fluid clutch apparatus is varied by actuating the at least one coil in the at least one magnetorheological fluid clutch apparatus to a current level below a current level corresponding to that of the desired remanent magnetization level.

Still further in accordance with the second aspect, for instance, the desired remanent magnetization level is removed.

Still further in accordance with the second aspect, for instance, varying an amount of torque transmission in the first mode is performed when the driven member applies a force to displace a door.

Still further in accordance with the second aspect, for instance, causing torque transmission between the driven member and the driving member is performed when the driven member maintains the door in a desired position.

Still further in accordance with the second aspect, for instance, the driven member maintains the door in a desired position by one said magnetorheological fluid clutch apparatus being a magnetorheological fluid brake apparatus.

In accordance with another aspect of the present disclosure, there is provided a magnetorheological fluid clutch apparatus comprising: a stator adapted to be connected to a structure, the stator having at least an annular wall; a first rotor rotatably mounted to the stator, the first rotor having at least one first shear surface; a second rotor rotatably mounted to the stator for rotating about a common axis with the first rotor, the second rotor having at least one second shear surface opposite the at least one first shear surface, the shear surfaces separated by at least one annular space; magnetorheological (MR) fluid in an MR fluid chamber including the at least one annular space, the MR fluid configured to generate a variable amount of torque transmission between the rotors when subjected to a magnetic field; an inner magnetic core connected to at least one of the rotors to rotate therewith so as to be rotatably mounted to the stator and an outer magnetic core, the connected to at least one of the rotors to rotate therewith so as to be rotatably mounted to the stator; outer and inner fluid gaps between the inner magnetic core and the annular wall, and between the outer magnetic core and the annular wall, the outer and inner fluid gaps entirely filled with a fluid; at least one coil supported by the annular wall and actuatable to deliver a magnetic field through the MR fluid, the magnetic field following a path comprising the annular wall, the outer fluid gap, the outer magnetic core, the at least one first shear surface and the at least one second shear surface, the inner magnetic core and the inner fluid gap; wherein one of the rotors is adapted to be coupled to a power input and the other of the rotors is adapted to be connected to an output whereby actuation of the at least one coil results in a variation of torque transmission between the rotors; and wherein one portion of the magnetic circuit is made from a hard or semi-hard magnetic material having of the type maintaining a remanent magnetization level.

In accordance with another aspect of the present disclosure, there is provided a magnetorheological fluid clutch or brake apparatus comprising: a first rotor rotatably to be connected to a structure, the first rotor having at least one first shear surface; a second rotor rotatably mounted to the stator for rotating about a common axis with the first rotor, the second rotor having at least one second shear surface opposite the at least one first shear surface, the shear surfaces separated by at least one annular space; magnetorheological (MR) fluid in an MR fluid chamber including the at least one annular space, the MR fluid configured to generate a variable amount of torque transmission between the rotors when subjected to a magnetic field; an inner magnetic core connected to at least one of the rotors and an outer magnetic core, connected to at least one of the rotors; at least one coil supported by the annular wall and actuatable to deliver a magnetic field through the MR fluid, the magnetic field following a path comprising the annular wall, the outer fluid gap, the outer magnetic core, the at least one first shear surface and the at least one second shear surface, the inner magnetic core and the inner fluid gap; wherein one of the rotors is adapted to be coupled to a power input and the other of the rotors is adapted to be connected to a structure whereby actuation of the at least one coil results in a variation of torque transmission between the rotors; and wherein one portion of the magnetic circuit is made from a hard or semi-hard magnetic material of the type maintaining a remanent magnetization level.

DESCRIPTION OF THE DRAWINGS

FIG. 10' is a series of B-H curves of various magnet types as may be used in MR fluid clutch apparatuses of the present disclosure;

DETAILED DESCRIPTION

Figure 1:
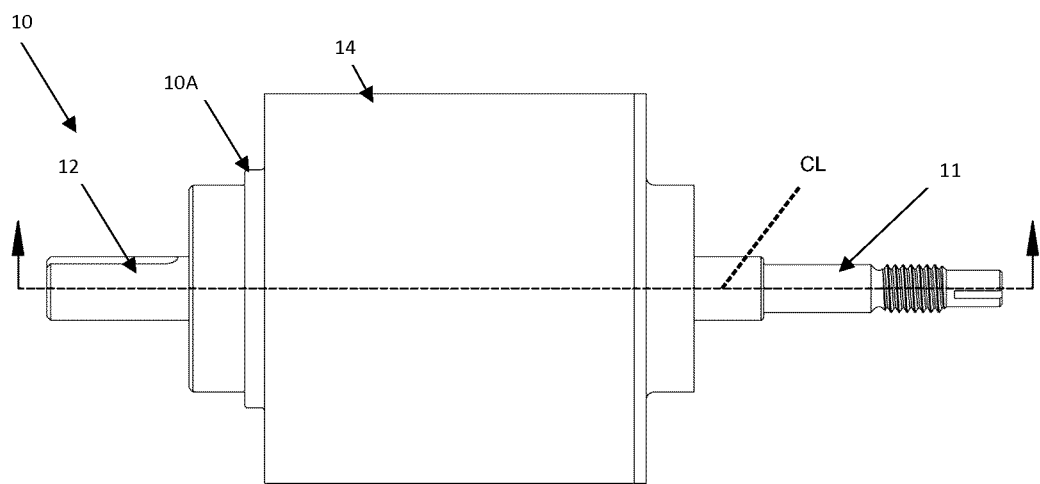
FIG. 1 is a schematic view of a generic magnetorheological (MR) fluid clutch apparatus, incorporating features of the present disclosure.

Referring to the drawings and more particularly to FIG. 1, there is illustrated a magnetorheological (MR) fluid clutch apparatus 10 configured to provide a mechanical output force based on a received input current and a force based on the remanent magnetization level of a magnetizable component in the magnetic circuit when there is no input current. The MR fluid clutch apparatus 10 is shown as being of the type having collinear input and output shafts 11 and 12. However, the concepts described herein may apply to other configuration of MR fluid clutch apparatuses, for instance some with an input or output outer shell/casing for an output or input shaft, etc. The principles illustrated here will be performed using a MR fluid clutch apparatus of drum type but could also be applied to a disc type MR fluid clutch apparatus. Moreover, the MR fluid clutch apparatus 10 may also be used as a brake, with for example the input being fixed to a structure. The expression MR fluid clutch apparatus may therefore include a MR fluid brake apparatus. When the expression MR fluid brake apparatus is used herein, it relates to a MR fluid clutch apparatus specifically used to inject a braking force. In some embodiments, the MR fluid clutch apparatus 10 is part of a MR fluid actuator, that may include the apparatus 10, along with a power source such as a motor, an optional transmission between the motor and the apparatus 10, such as a reduction gearbox, etc.

The MR fluid clutch apparatus 10 may provide an output force in response to an input current received from an operator, to transmit an input force and an output force based on the magnetization level of a magnetizable component in the magnetic circuit when there is no input current. The example MR fluid clutch apparatus 10 may have a stator 10A to which the MR fluid clutch apparatus 10 is connected to a structure. The MR fluid clutch apparatus 10 features driven member 11 and driving member 12 separated by gaps filled with an MR fluid, as explained hereinafter. The driving member 12 may receive rotational energy (torque) from a power device, such as a motor, with or without a transmission, such as a reduction gear box, etc.

According to an embodiment, the driving member 12 may be in mechanical communication with a power input (directly or through a transmission), and driven member 11 may be in mechanical communication with a power output (i.e., force output, torque output). The stator 10A, the driven member 11 and the driving member 12 may be interconnected by bearings 12A and 12B. In the illustrated embodiment, the bearing 12A is between the stator 10A and the driving member 12, whereas the bearing 12B is between the driven member 11 and the driving member 12. Seal(s) 12C may also be provided at the interface between the stator 10A, the driven member 11 and the driving member 12, to preserve MR fluid between the members 11 and 12. Moreover, the seals 12C are provided to prevent MR fluid from reaching the bearing 12B or to leak out of the apparatus 10.

Figure 2:
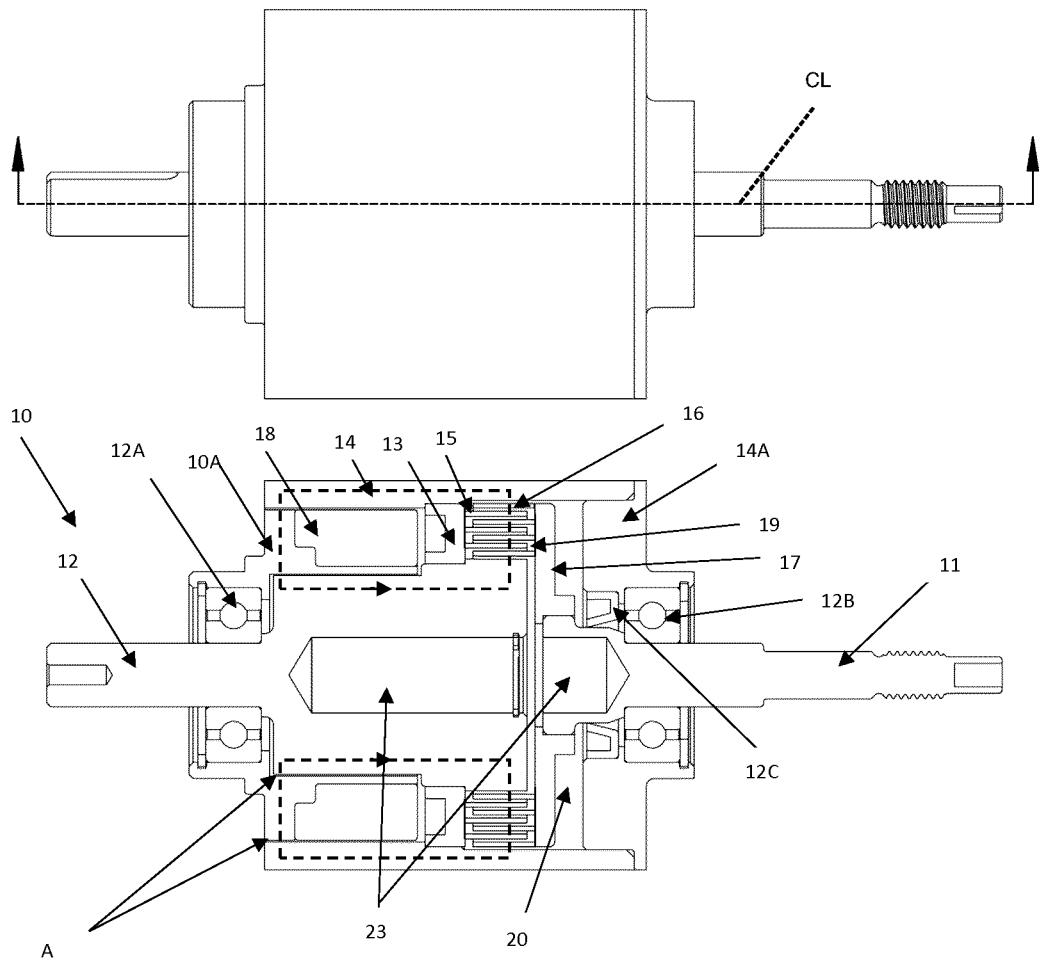
FIG. 2 is a sectioned schematic view of the MR fluid clutch apparatus of FIG. 1, in accordance with an embodiment.

As shown with reference to FIGS. 2-4 below, drums are located circumferentially about the rotational axis CL. Some support must therefore extend generally radially to support the drums in their circumferential arrangement. In accordance with one embodiment, referring to FIG. 2, a low permeability input drum support 13 (a.k.a., radial wall) projects radially from a shaft of the driving member 12. The input drum support 13 may be connected to an input rotor 14 defining the outer casing or shell of the MR fluid clutch apparatus 10. The input rotor 14 may therefore be rotatably connected to the driven member 11 by the bearing 12B. In an embodiment, the input rotor 14 has an input rotor support 14A which forms a housing for the bearing 12B. According to an embodiment, the input rotor support 14A is an integral part of the input rotor 14, and may be fabricated as a single piece. However, in an embodiment, the input rotor support 14A is ideally made from a low permeability material and the input rotor 14 is made from a high permeability material. As another embodiment, as shown in FIG. 2, the input rotor support 14A may be defined by an annular wall fabricated separately from a remainder of the input rotor 14, though both are interconnected for concurrent rotation. Therefore, the shaft of the driving member 12, the input drum support 13, and the input rotor 14 rotate concurrently. In an embodiment, it is contemplated to have the outer shell of the MR fluid clutch apparatus 10 be part of the stator 10A, or of the driven member 11.

The input drum support 13 may support a plurality of concentric annular drums 15, also known as input annular drums. The input annular drums 15 are secured to the input drum support 13 and rotate therewith. In an embodiment, concentric circular channels may be defined (e.g., machined, cast, molded, etc) in the input drum support 13 for insertion therein of the drums 15. A tight fit (e.g., force fit), an adhesive and/or radial pins are some of the mechanical components that may be used to secure the drums 15 to the input drum support 13. In an embodiment, the input drum support 13 is monolithically connected to the shaft of the driving member 12, whereby the various components of the driving member 12 rotate concurrently when receiving the drive from the power source.

The driven member 11 is represented by an output shaft as a possibility, configured to rotate about axis CL as well. The output shaft 11 may be coupled to various mechanical components that receive the transmitted power output when the clutch apparatus 10 is actuated to transmit at least some of the rotational power input.

The driven member 11 also has a one or more concentric annular drums 16, also known as output drums, mounted to an output drum support 17. The output drum support 17 may be an integral part of the output shaft, or may be mounted thereon for concurrent rotation. The annular drums 16 are spaced apart in such a way that the sets of output annular drums 16 fit within the annular spaces between the input annular drums 15, in intertwined fashion. When either of both the driven member 11 and the driving member 12 rotate, there is no direct contact between the annular drums 15 and 16, due to the concentricity of the annular drums 15 and 16, about axis CL. In the embodiment of FIG. 2, the driving member 12 or the input rotor 14 may consist of or may include a magnetizable (a.k.a., magnetisable) part (e.g., ferrite). Alternatively, input rotor 14 may be consist of a magnetizable component.

Figure 3:
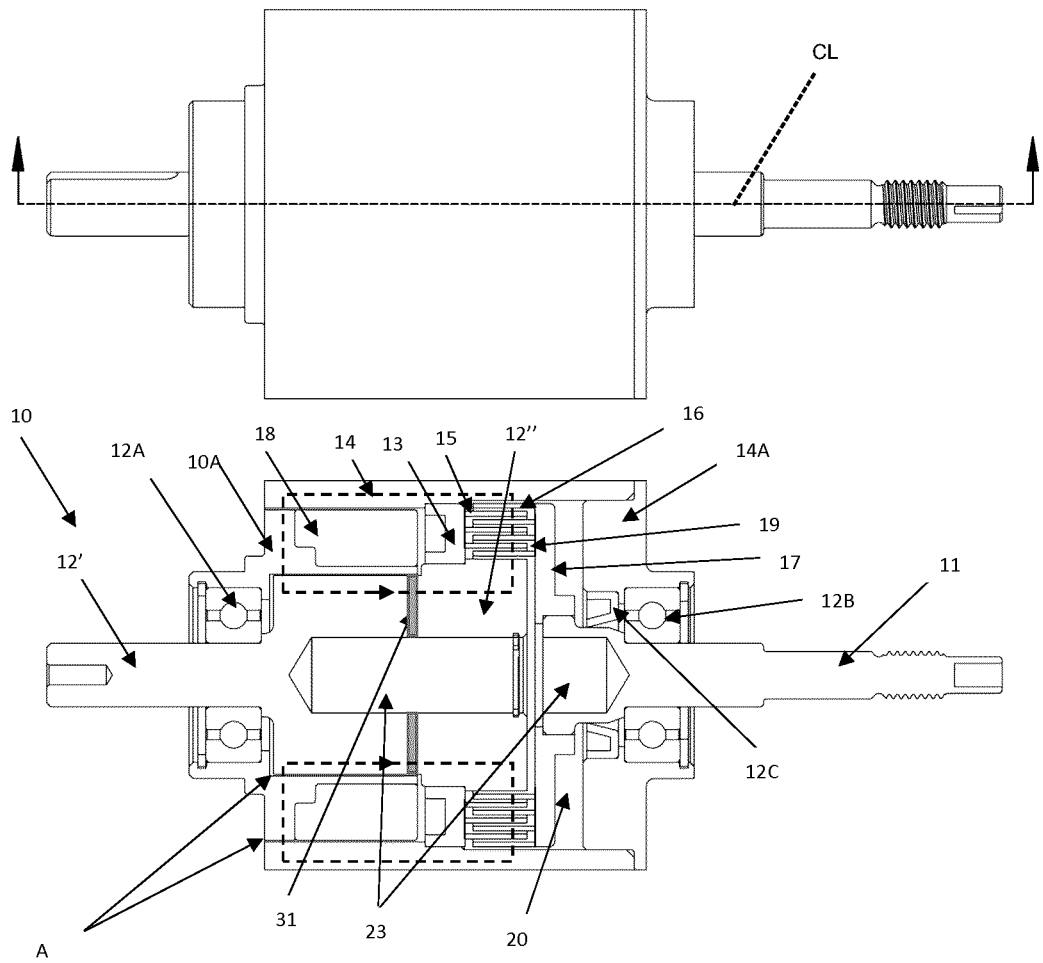
FIG. 3 is a sectioned schematic view of the MR fluid clutch apparatus of FIG. 1, in accordance with another embodiment.

In the embodiment of FIG. 3, the MR fluid clutch apparatus 10 is similar to the one of FIG. 2, whereby like reference numerals represent like elements. In the embodiment of FIG. 3, the driving member 12 is separated in two sections, 12' and 12", and a magnetizable component(s) 31 is located in between the two sections 12' and 12" within the magnetic circuit (a.k.a., magnetic path). The concept of two sections 12' and 12" does not necessarily suggest that the sections may be separated from one another. The driving member 12 may be an integral component including the magnetizable component 31. The magnetizable component 31 is shown as having different aspects in the figures of the present disclosure. The magnetizable component 31 is made of a material having the capacity of maintaining a remanent magnetization level after being exposed to a magnetic field of a given magnitude, such that the magnetizable component 31 generates a magnetic field itself. Such materials are described in further detail below. The magnetizable component 31 may be annular in shape, for instance by forming a ring integrated into various components of the MR fluid clutch apparatus 10. As another variation, the magnetizable component 31 may be a plurality of discrete magnetizable components 31. Such discrete magnetizable components 31 may be circumferentially distributed around the central axis of the MR fluid clutch apparatus 10, essentially forming a ring around the central axis. The spacing between the magnetizable components 31 may vary. In another variation, the plurality of discrete magnetizable components 31 are arranged in an axisymmetric manner.

Figure 4:
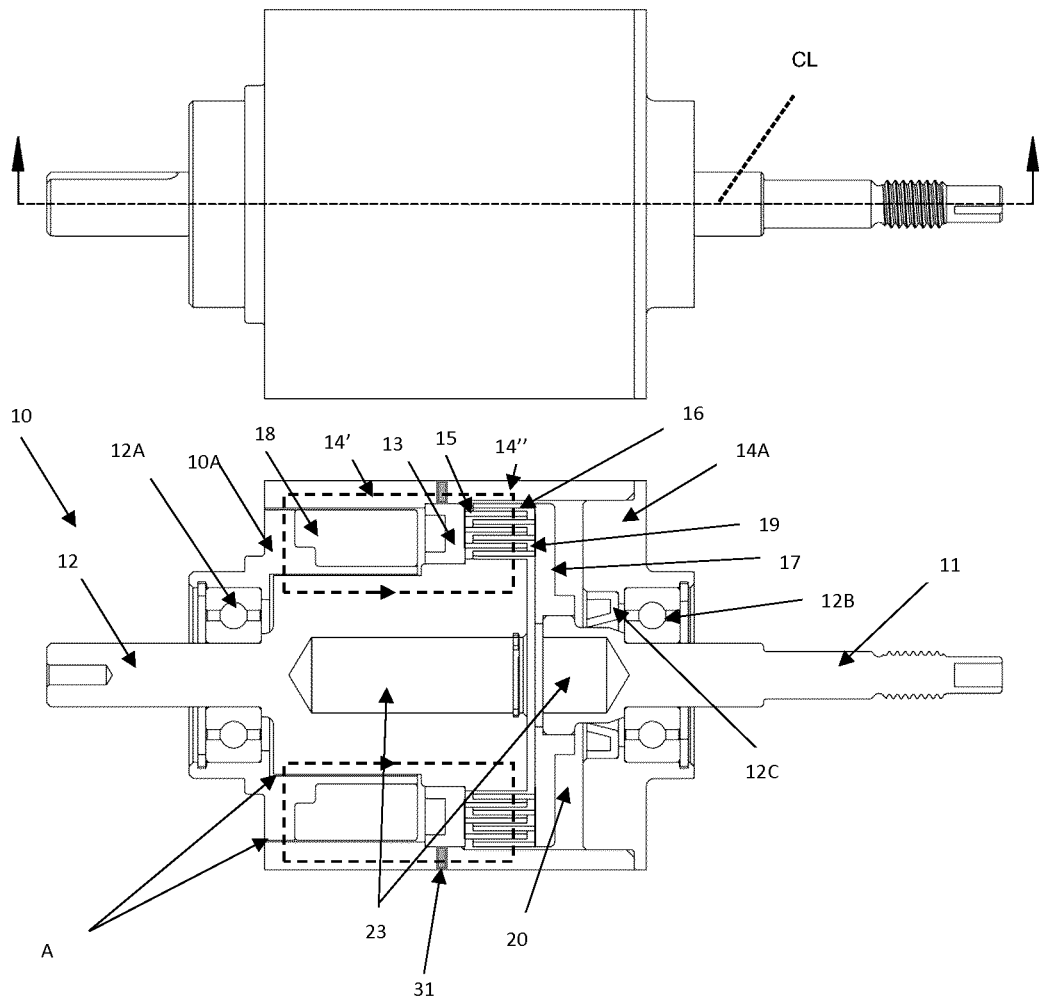
FIG. 4 is a sectioned schematic view of the MR fluid clutch apparatus of FIG. 1, in accordance with yet another embodiment.

In the embodiment of FIG. 4, the MR fluid clutch apparatus 10 is similar to the one of FIG. 2, whereby like reference numerals represent like elements. In the embodiment of FIG. 4, the input rotor 14 is separated in two sections, 14' and 14" and a magnetizable component(s) 31 is within the magnetic circuit. Again, the concept of two sections 14' and 14" does not necessarily suggest that the sections may be separated from one another. The input rotor 14 may be an integral component including the magnetizable component 31 with the two sections 14' and 14".

Figure 5:
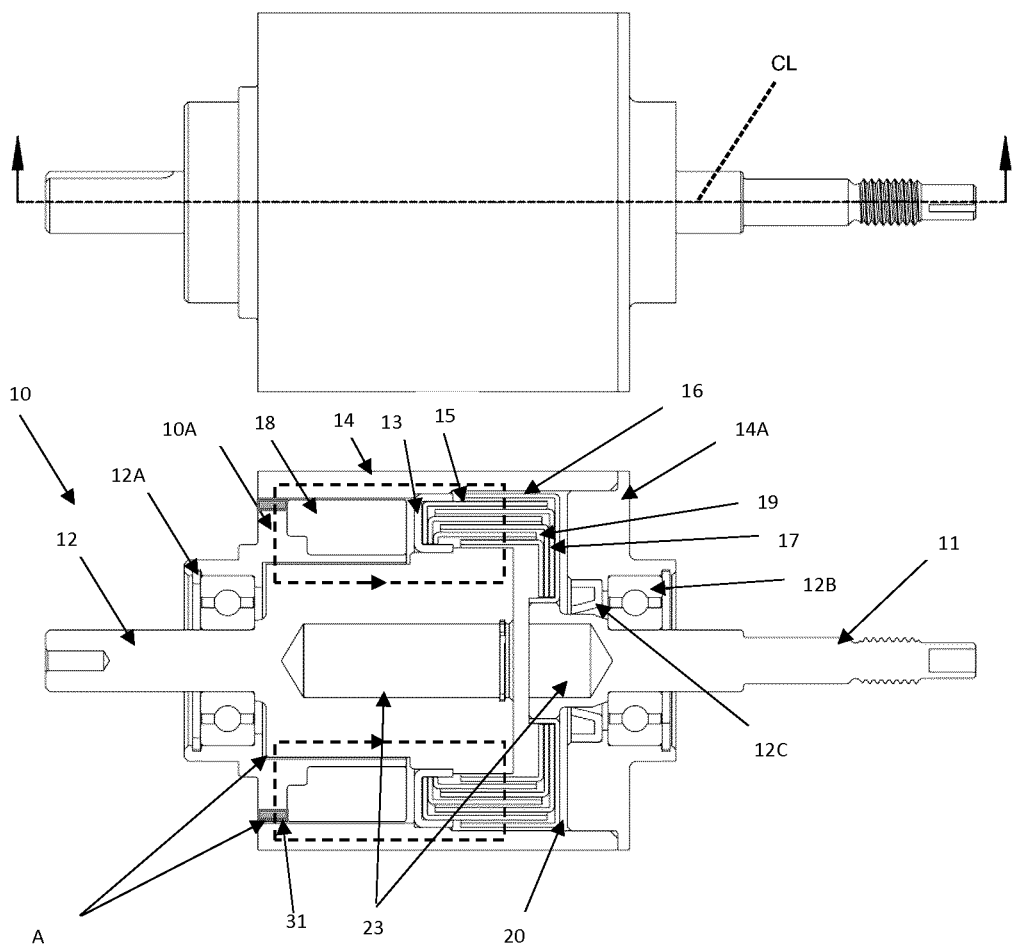
FIG. 5 is a sectioned schematic view of the MR fluid clutch apparatus of FIG. 1, in accordance with yet another embodiment.

In the embodiment of FIG. 5, the MR fluid clutch apparatus 10 is similar to the one of FIG. 2, whereby like reference numerals represent like elements. In the embodiment of FIG. 5, the input drums 15 and/or the output drums 16 are made in a light low-permeability material (e.g., plastic, plastic doped with metallic particle or aluminum). Additionally, the input rotor 14 is equipped with a magnetizable component(s) 31 located in the magnetic circuit at the fluid (i.e. air) gap between input rotor 14 and stator 10A.

Figure 6:
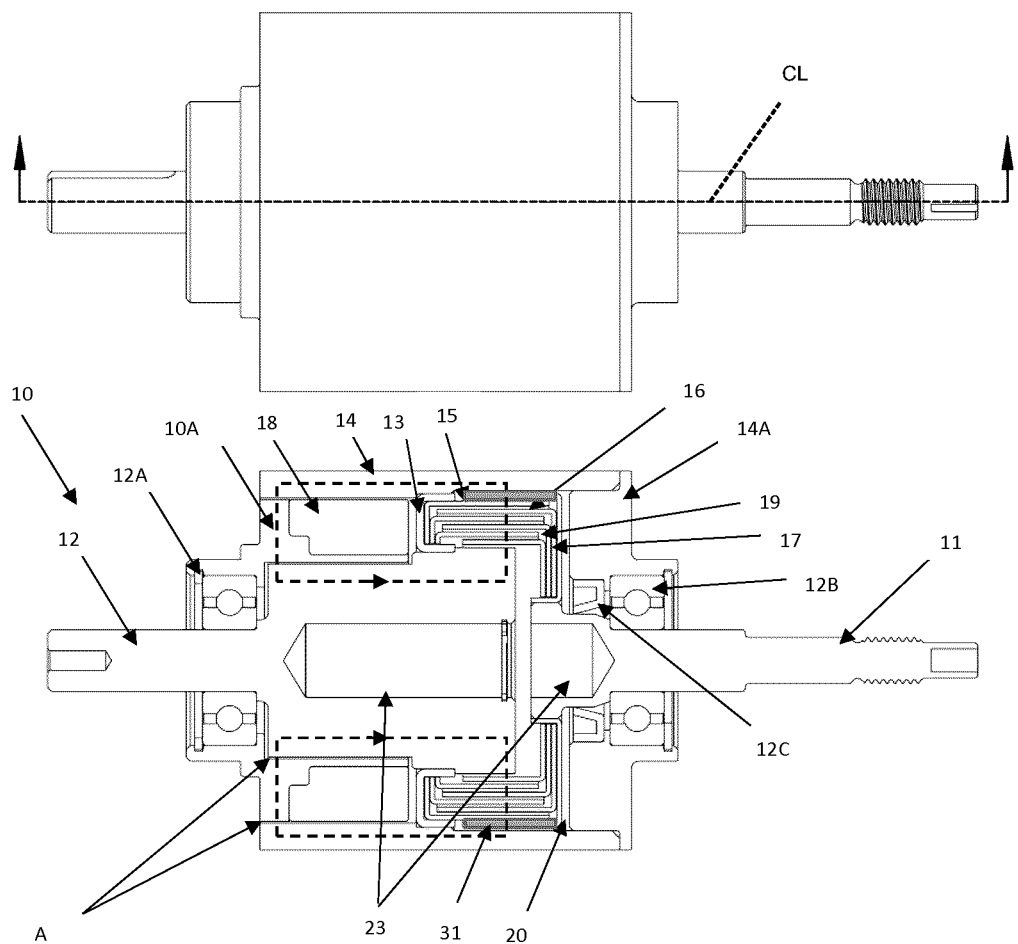
FIG. 6 is a sectioned schematic view of the MR fluid clutch apparatus of FIG. 1, in accordance with yet another embodiment.

In the embodiment of FIG. 6, the MR fluid clutch apparatus 10 is similar to the one of FIG. 5, whereby like reference numerals represent like elements. In the embodiment of FIG. 5, one or multiple drums 15 or 16 are replaced by a magnetizable component 31 (a.k.a., drum) that is part of the magnetic circuit. Alternatively, one or multiple drums 15 or 16 may be coated with magnetizable component material.

Therefore, FIGS. 2 to 6 show various contemplated locations for a magnetizable component(s) 31 in the MR fluid clutch apparatus 10. In all of such aspects, the magnetizable component 31 is within the magnetic circuit, and may generate its own magnetic field along the same circuit, or like circuit. It is also observed that annular gaps A are present between the stator 10A and the rotor 14. The annular gaps A may be positioned radially between the stator 10A and the rotor 14, between the stator 10A and the driving member 12, or may be at other locations, in other orientations (axial gaps). The annular gaps A may be referred to as fluid gaps as they are typically filled with a fluid, i.e., air from ambient, or other non-MR fluid. The annular gaps A may be referred to as empty as well. Some of the MR fluid clutch apparatuses may be without such gaps.

In FIGS. 1 to 6, an electromagnet unit 18 is supported by the stator 10A, and is used to activate and control the clutch function of the MR fluid clutch apparatus 10. The electromagnetic unit 18 is shown schematically, but conventionally may have an annular coil and a core forming an electromagnet, all necessary wiring to create a variable magnetic field. According to an embodiment, the annular spaces have a width of 0.25 mm to 1 mm, between the facing surfaces of sets of drums 15 and 16, i.e., in the radial direction. The width range of the annular spaces is provided only as a non-exclusive example, as other annular space widths are considered as well, taking into account various factors such as overall torque, part sizes, viscous drag, etc.

The annular spaces between the annular drums 15 of the driving member 12, and the annular drums 16 of the driven member 11 are filled with the MR fluid 19. The MR fluid 19 used to transmit force between the driven member 11 and the driving member 12 is a type of smart fluid that is composed of magnetisable particles disposed in a carrier fluid, usually a type of oil. When subjected to a magnetic field, the fluid may increase its apparent viscosity, potentially to the point of becoming a viscoplastic solid. The apparent viscosity is defined by the ratio between the operating shear stress and the operating shear rate of the MR fluid comprised between opposite shear surfaces. The magnetic field intensity mainly affects the yield shear stress of the MR fluid. The yield shear stress of the fluid when in its active ("on") state may be controlled by varying the magnetic field intensity produced by electromagnets i.e., the input current and/or via a remanent magnetization level of the magnetizable component 31, via the use of a controller. The effective magnetic flux in the MR fluid may be the sum of the two. Accordingly, the MR fluid's ability to transmit force can be controlled with an electromagnet, for the MR fluid to act as a clutch between the members 11 and 12. The electromagnet unit 18 is configured to vary the strength of the magnetic field such that the friction between the members 11 and 12 may even be low enough to allow the driving member 11 to freely rotate with the driven member 12 and vice versa. Consequently, the MR fluid clutch apparatus 10 may vary the amount of force provided in response to a received input by changing the amount of magnetic flux to which is exposed the MR fluid 19. In particular, the MR fluid clutch apparatus 10 may provide an output force based on the input force by changing the amount of magnetic flux based on the input force.

The annular spaces between each set of drum 15 and 16 are part of a MR fluid chamber sealed off by a seal or seals. The MR fluid chamber include the annular spaces between the set of drums 15 and 16, in addition to space at the end of drum tips, and space between the drums 15 and 16 and shear surfaces that are part of the shaft of the driving member 12 and input rotor 14. The MR fluid chamber may also include the annular space 20, located opposite the output drum support 17, though such annular space 20 may not be present. According to an embodiment, a flow of the MR fluid is as follows. When the driving member 12 rotates, some pumping action may be created by the input drums 15, by which the MR fluid 19 moves in a radial outward direction after reaching ends of drums 15 and 16. Upon going beyond the outermost drum 16, the MR fluid 19 may be directed to pass the radial edge of the output drum support 17 and into the annular space 20. The MR fluid 19 will move radially inward, to return to the other side of the output drum support 17 to cycle between the drums 15 and 16, via holes in the output drum support 17. The space 20 may be in fluid communication with an expansion system 23. This is one example among others of MR fluid circulation.

The movement of the MR fluid in the manner described above allows the MR fluid to cycle in the MR fluid chamber. The movement may be achieved via the presence of helical channels on the surface of the drums 15. Other surface depressions or local variations of permeability could also be used on either one of the drum sets 15 or 16 to induce a pumping action in the MR fluid chamber, i.e., some form of cavity, protrusion or channel in an otherwise smooth cylindrical surface.

When a current passes through the electromagnet unit 18, a magnetic field is produced in the magnetic circuit or path that includes the magnetizable component 31, the intertwined arrangement of drums 15 and 16 and the shear surfaces of the shaft 12 and the input rotor 14, with MR fluid 19 therebetween. The magnetic field therefore increases the apparent viscosity of the MR fluid 19, to seize the drums 15 and 16, to cause a transmission of the rotational motion from the input drums 15 to the output drums 16. The intertwined arrangement of drums 15 and 16 allows the increase of the total clutch shear surfaces per volume of MR fluid 19. The electromagnet unit 18 is used to increase the magnetic field in the magnetic circuit. Since the magnetic circuit includes a magnetizable component 31, the magnetizable component 31 may be magnetized when a current passes through the annular coil 18. When the current is removed, the magnetizable component 31, because of its hysteretic behaviour, remains magnetized, but at a lower level that the magnetic field that was applied to the magnetic circuit. The radial fluid gaps A between input rotor 14 and stator 10A and between shaft 12 and the stator 10A are radial rather than axial in the illustrated embodiment, though axial gaps are contemplated. It may be desired to use radial gaps A as radial tolerance is readily reached so that the fluid gaps can be quite small (<0.2 mm) and thus the additional number of turns in the coil required to magnetize the fluid gaps 34A and 34B is minimized. Also, the magnetic attractive force in the fluid gaps A between the stator 10A and both magnetic input rotor 14 and shaft 12 may be nearly cancelled due to the rotational symmetry of the fluid gaps on opposite sides of the stator 10A.

Figure 9:
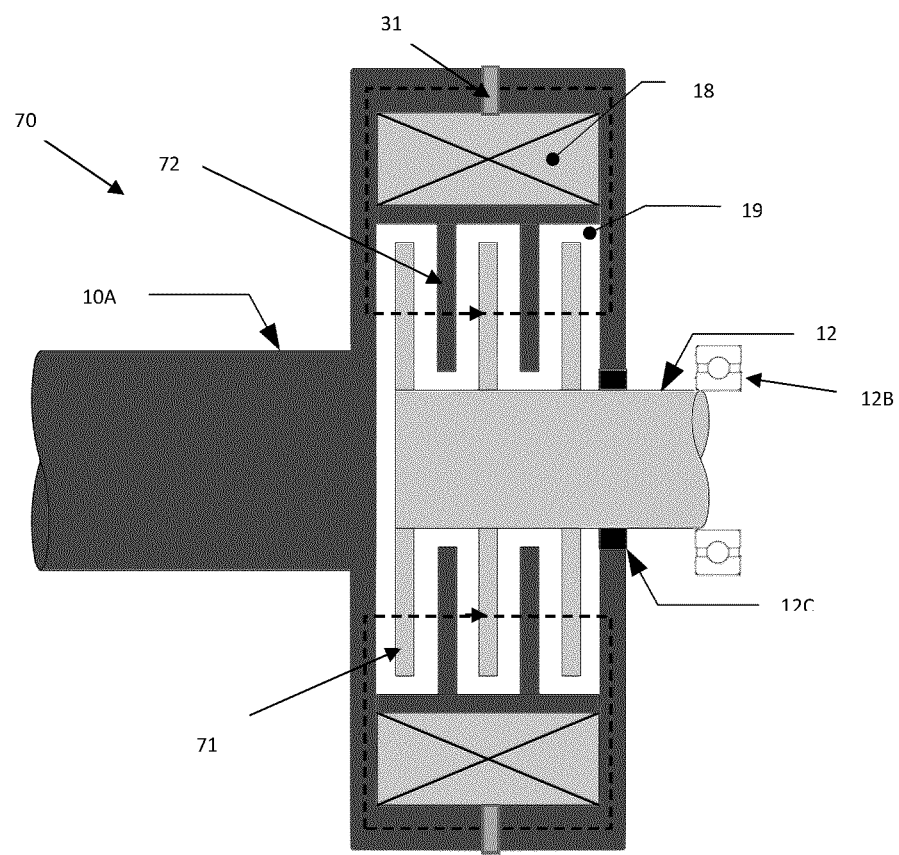
FIG. 9 is a sectioned schematic view of a MR fluid clutch apparatus or a MR fluid brake apparatus in accordance with yet another embodiment.

Referring to FIG. 9, there is illustrated a MR fluid clutch apparatus 70 having discs instead of drums. The MR fluid brake apparatus a MR fluid brake apparatus 70 is similar to the MR fluid brake apparatuses 10 of FIGS. 1 to 7, whereby like reference numerals represent like elements. In this embodiment, drums are replaced by discs 71 and 72. Input disc or discs 71 are connected to driving member 12 while output disc or discs 72 are connected to the stator 10A.

Figure 7:
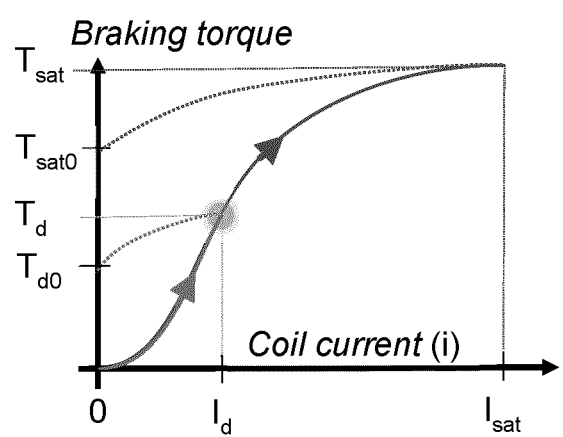
FIG. 7 is a graphic representation of the magnetization process of MR fluid apparatuses in accordance with an aspect of the present disclosure.

In such a disc or discs type of MR fluid clutch apparatus, the forces generated by the coil or a magnetizable component 31 generate axial loads on the bearing when the magnetic circuit is not perfectly equilibrated. The axial load generated in the bearing may affect durability and may have an impact on reliability of the system as wear may cause the assembly to move axially over time. The more axially mis-centered the disc or discs will be, the more it will create axial loads in the bearings that will increase the rate of wear proportionally. Moreover, the disc type of MR fluid clutch apparatus 70, equipped with a magnetizable part 31 may be more difficult to control as plates may bend under the axial load created on the discs 71 or 72. Because of a very tight axial tolerance stack up for a multiple disc type of device, small gaps may be more difficult to maintain FIG. 7 shows an example of a relationship (solid line) between the torque (T) generated in the MR fluid clutch apparatus 10 and the current (I) in the electromagnetic unit 18, assuming that the magnetizable component 31 is initially demagnetized. When the current in the electromagnetic unit 18 is at $I_{sat}$ level, the effective torque generated by MR fluid clutch apparatus 10 may correspond to $T_{sat}$ level (maximum level reachable by the MR fluid clutch apparatus 10). When the current is removed in the electromagnetic unit 18, the magnetizable component 31, because of its hysteresis nature, will maintain a magnetization level of the magnetic circuit and the MR fluid clutch apparatus 10 will generate a torque $T_{sat0}$, even if the current is removed (i.e. I=0 A) in the electromagnetic unit 18. Similarly, when the current in the electromagnetic unit 18 is at level $I_d$, the effective torque generated by MR fluid clutch apparatus 10 may correspond to level $T_d$—when the current is removed in the electromagnetic unit 18, the magnetizable component 31, because of its hysteresis nature, will maintain a magnetization level of the magnetic circuit and the MR fluid clutch apparatus 10 will generate a torque $T_{d0}$, even if the current is removed (i.e. I=0 A) in the electromagnetic unit 18. By using the proper current I in the electromagnetic unit 18, the magnetizable component 31 may be magnetized, and the effective MR fluid clutch apparatus 10 torque when there is no current in the electromagnetic unit 18 may be adjusted to any level between 0 ant $T_{sat0}$. It is to be noted that not all current levels in the electromagnetic unit 18 may affect the $T_{d0}$. When current is maintained under $I_d$, it is possible to generate in the MR fluid clutch apparatus 10 a magnetic field that will result in a torque over $T_{d0}$, hence increasing momentarily the torque generated by the MR fluid clutch apparatus 10 without affecting its "programmed" $T_{d0}$. The expression "programmed" may be interpreted as a synonym to a set torque, a desired torque, a selected torque, for example. Alternatively, by injecting a negative current in the MR fluid clutch apparatus 10, it is possible to momentarily decrease the torque generated by the MR fluid clutch apparatus 10 without affecting its "programmed" $T_{d0}$. By keeping the current in the range that will not affect the $T_{d0}$ value (i.e., at or below $I_d$ in FIG. 7), it may be possible to operate a MR fluid clutch apparatus 10 where the $T_{d0}$ value may be programmed with low bandwidth, to then adjust finely the torque generated by the MR fluid clutch apparatus 10 around $T_{d0}$ with high bandwidth. The capacity to adjust the torque at high bandwidth will be affected by the type of magnet used for the magnetizable component 31 that may need to be selected differently for a specific application and adjustability range.

Figure 8:
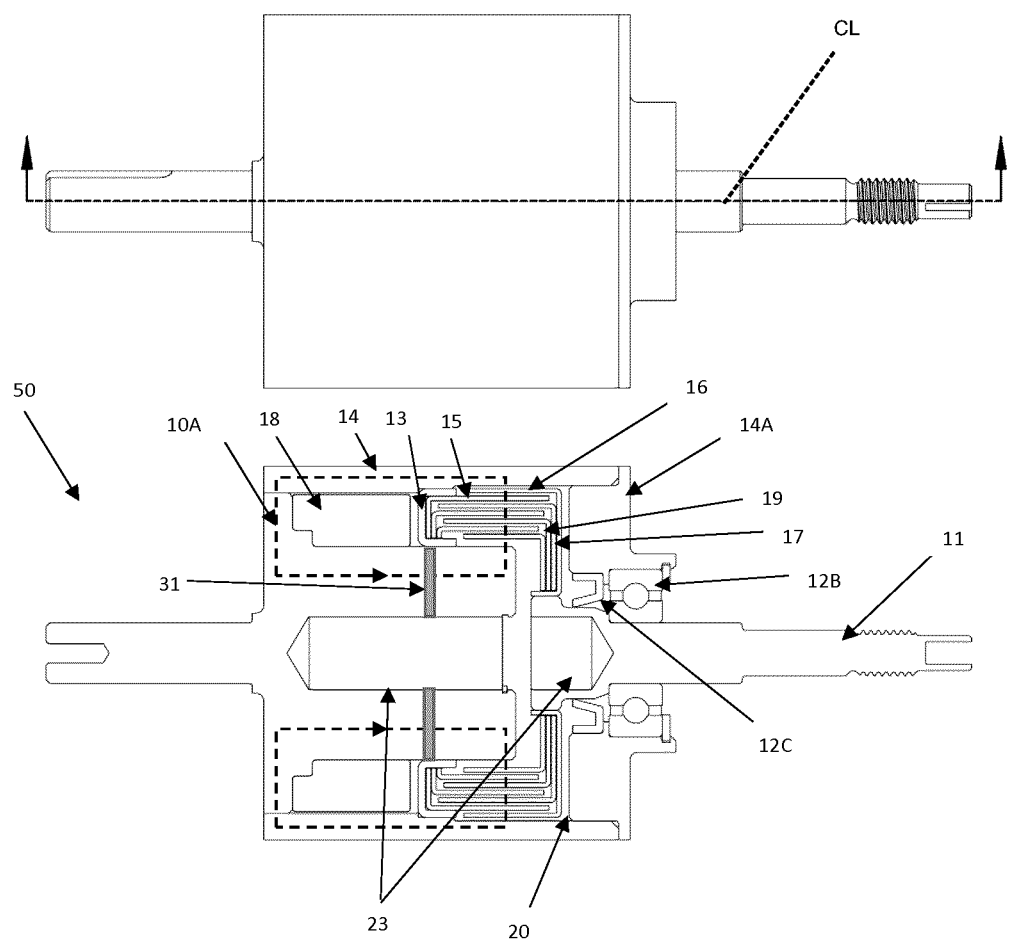
FIG. 8 is a sectioned schematic view of a MR fluid brake apparatus incorporating features of the present disclosure.

FIG. 8 is showing a MR fluid brake apparatus 50 similar to the MR fluid clutch apparatus 10 of FIG. 2, whereby like reference numerals represent like elements. In FIG. 8, the driving member 12 and the stator 10A are now attached together as non-moving part in order to act as a brake when stator 10A is mounted on a chassis (not illustrated). Torque generation of the MR fluid brake apparatus 50 is similar to the one of MR fluid clutch apparatus 10 of FIGS. 1 to 7, and the magnetized part 31 may be at any appropriate location, such as those shown in FIGS. 2 to 6.

Figure 10:
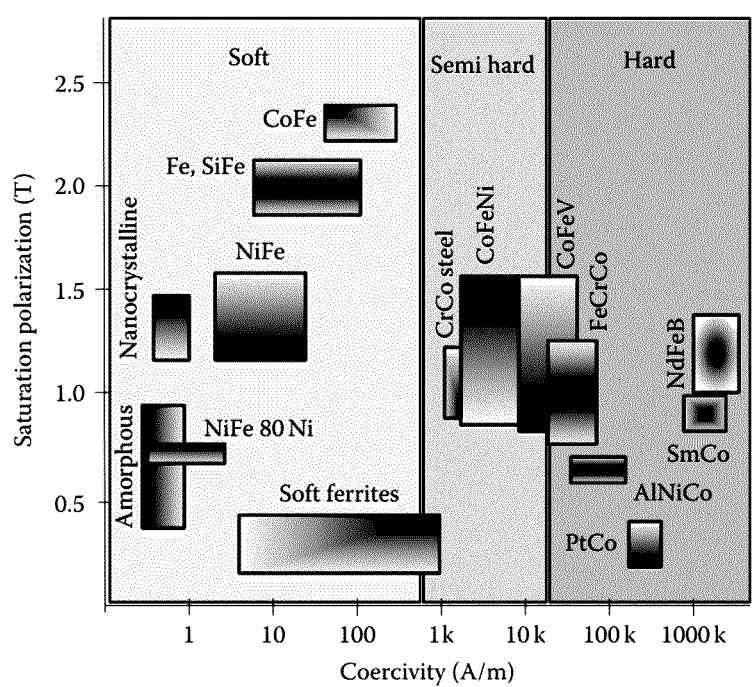
FIG. 10 is a graph that shows groupings of magnetic material in three categories.
Figure 10:
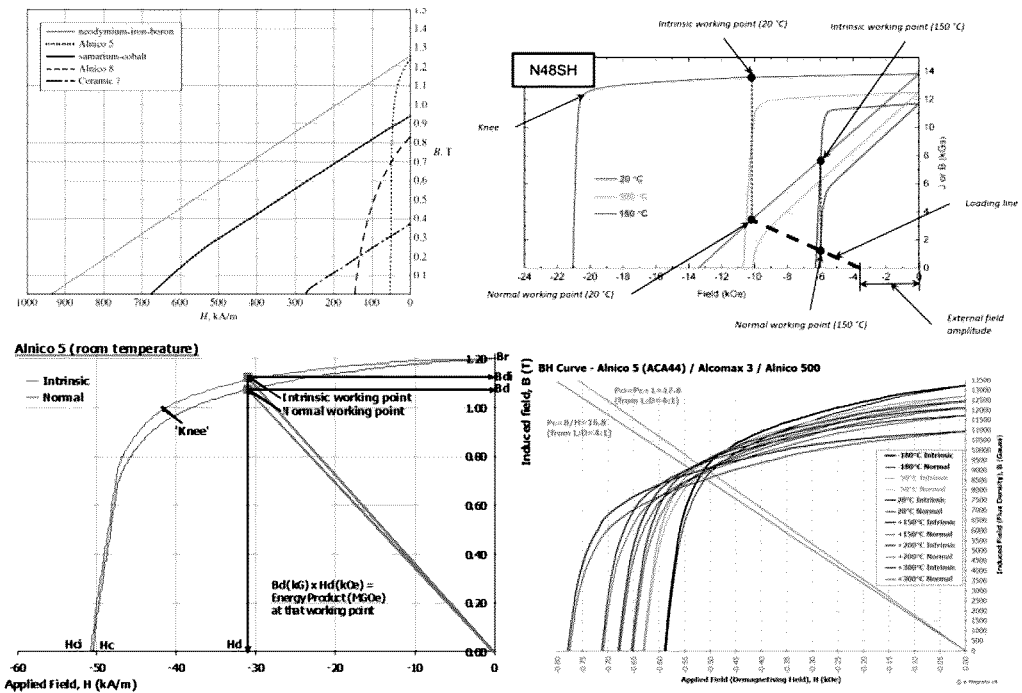

FIG. 10 shows various types of materials from which the magnetizable component 31 may be made. In the shown embodiments, magnetizable components 31 are ideally made from semi-hard or hard magnetic material where coercivity is high. It may represent an advantage to use hard magnetic material with high retentivity in the magnetic circuit of the MR fluid clutch apparatuses 10 and 70 (including the brake 50) in order to maintain the size and weight of the magnetic material to a minimum as semi-hard or hard magnetic material are usually more expensive than soft magnetic material (i.e. standard carbon steel). However, semi-hard or hard magnetic material may need more energy per volume to magnetize or demagnetize and may have higher hysteresis. In a MR fluid apparatus of the present disclosure, hysteresis is known to reduce the bandwidth of the apparatus. If the volume of magnetizable material 31 should be reduced to a minimum to achieve a more economical solution, the use of hard material may represent a better option. However, the use of the hard material, because of its higher hysteresis may come at the detriment of the bandwidth of the MR fluid clutch 10 or brake 50 apparatuses. If the bandwidth of the MR fluid clutch 10 or brake 50 apparatus is important, the use of semi-hard material may represent a better option for the magnetizable material 31 but will come to the detriment of cost since more volume of magnetizable material 31 will be required to generate a given magnetic flux when no current is generated in the coil 18.

FIG. 10' shows exemplary saturation curves (a.k.a. B-H curves of applied external magnetic field H for total magnetic flux density B) for some types of magnetic material of FIG. 10 in which the magnetizable component 31 may be made. Materials having the highest residual field Br may allow a minimization of cross-section of the magnetic circuit of the MR fluid clutch apparatus 10. Thus, hard magnets like Neodymium-iron-boron, samarium cobalt and semi-hard materials like AlNiCo are well suited to be used as magnetizable components 31. The level of magnetization of a magnetic material is directly related to its intrinsic working point on the intrinsic B-H curve. The intrinsic working point of the magnetic material is defined by the loading line determined by the magnetic circuit properties and the external magnetic field which is created by the applied current in the coil of the electromagnet unit 18 of the MR fluid clutch apparatus 10. By increasing the demagnetization current in the coil of the electromagnet unit 18, the loading line is shifted to the left. When the intrinsic working point goes below the knee of the intrinsic B-H curve, the magnetic material will lose some energy after removal of the current in the coil of the electromagnet unit 18. A difference between hard materials (such as Neodyme-Iron-Boron N48SH) and semi-hard materials (such as AlNiCo) is the location of the knee in the intrinsic B-H curve. For AlNiCo, the intrinsic curve and normal curves are quite similar, thus, the demagnetization is easily achieved. On the contrary, for Neodyme-Iron-Boron, higher current in the coil is required to reach the knee of the intrinsic B-H curve and thus demagnetize the hard material. Neodyme-Iron-Boron belongs to the family of rare earth magnets, not as readily available as AlNiCo. Also, depending on the grade of the magnet, magnetic properties of Neodyme-Iron-Boron may be altered by the temperature and may not be suitable for applications requiring stability with temperature, for example in automotive applications requiring stability between −30 deg C. and 80 deg C. AlNiCo is less sensitive to temperature variations and thus may be suitable for applications involving temperature variations.

Figure 11:
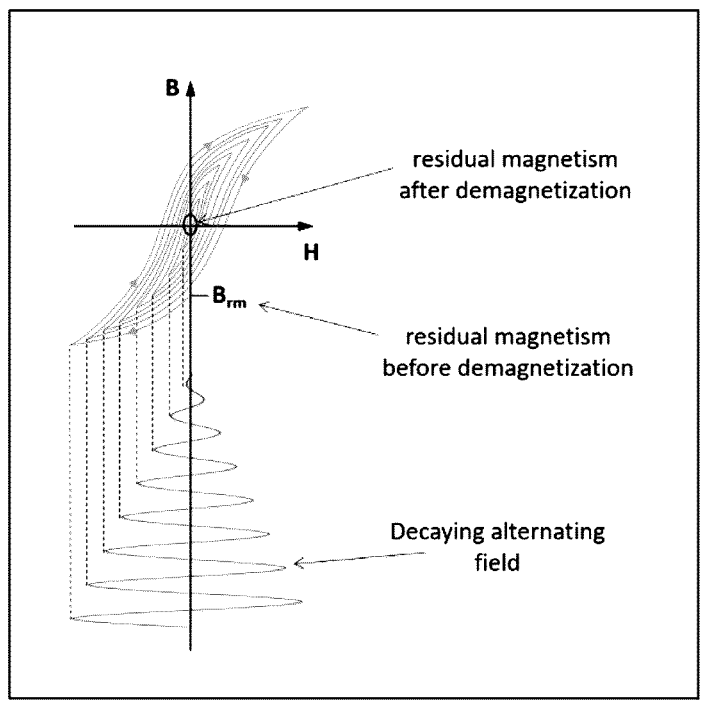
FIG. 11 is a graphic representation of an exemplary demagnetization process of MR fluid apparatuses in accordance with an aspect of the present disclosure.

FIG. 11 shows the demagnetization process that may be required to reduce the remanent magnetization level of the magnetizable component 31 close to 0, as driven by the electromagnet unit 18. Since the magnetizable component 31 is chosen to have high hysteresis, it may present an advantage to use a degaussing process. An alternating current is applied in the coil 18. A controller may start by generating a higher current in the coil 18 and reduce it until it is null to then generate a reverse current in the coil 18 to a lower level than the previous, continuing until the level of alternative current reaches close to 0. Alternating current rapidly switches directions, changing the orientation of the electromagnetic field. The magnetic dipoles in the magnetizable component 31 try to orient according to the field, but as the field is changing, they end up randomized. The core of the material may retain a slight magnetic field due to hysteresis but a generally null remanent magnetic field may be attained in the magnetic circuit when no current is supplied to the coil 18.

Figure 12:
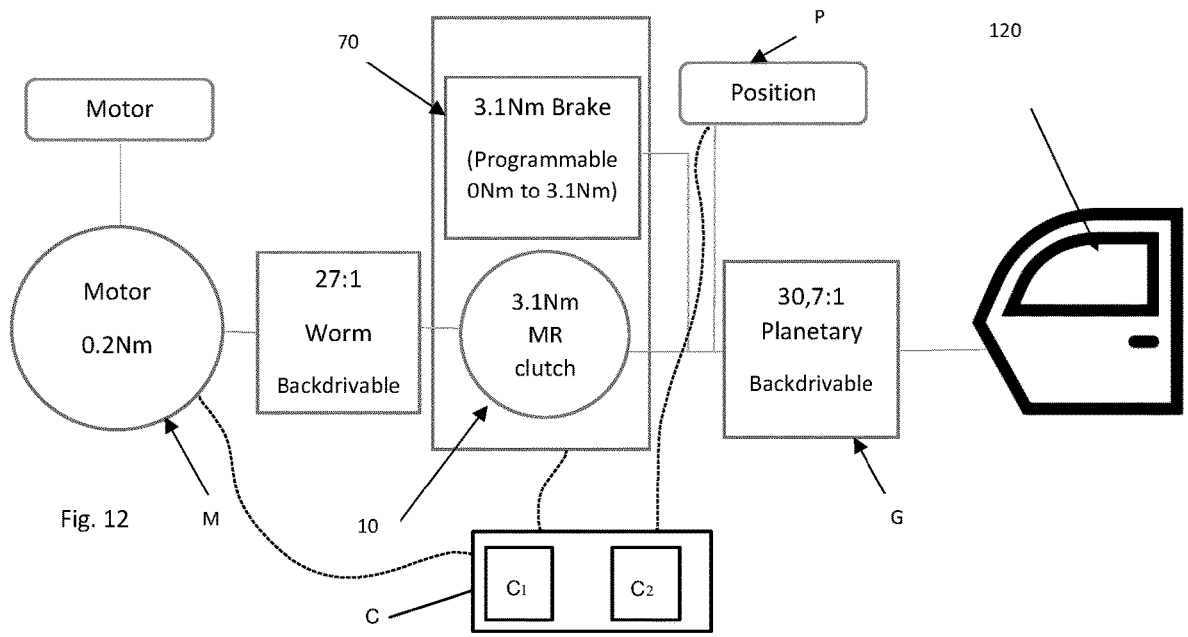
FIG. 12 is a schematic view of a system featuring MR fluid apparatuses as used with a vehicle door.
Figure 13:
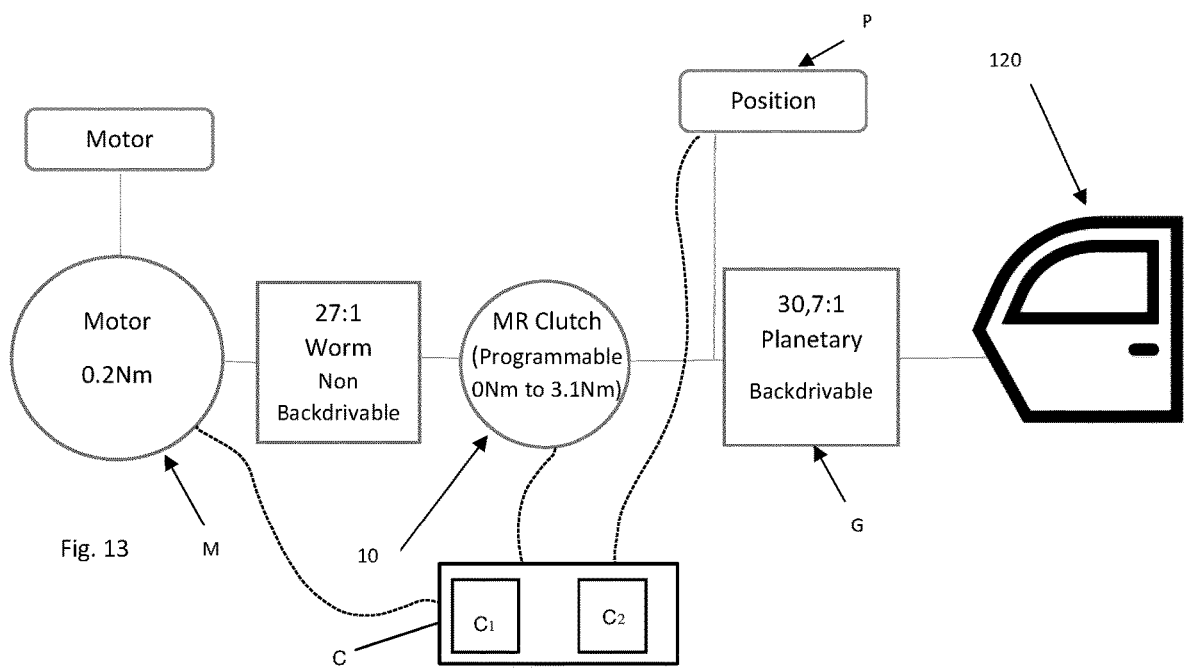
FIG. 13 is a schematic view of another system featuring a MR fluid apparatus as used with a vehicle door.
Figure 14:
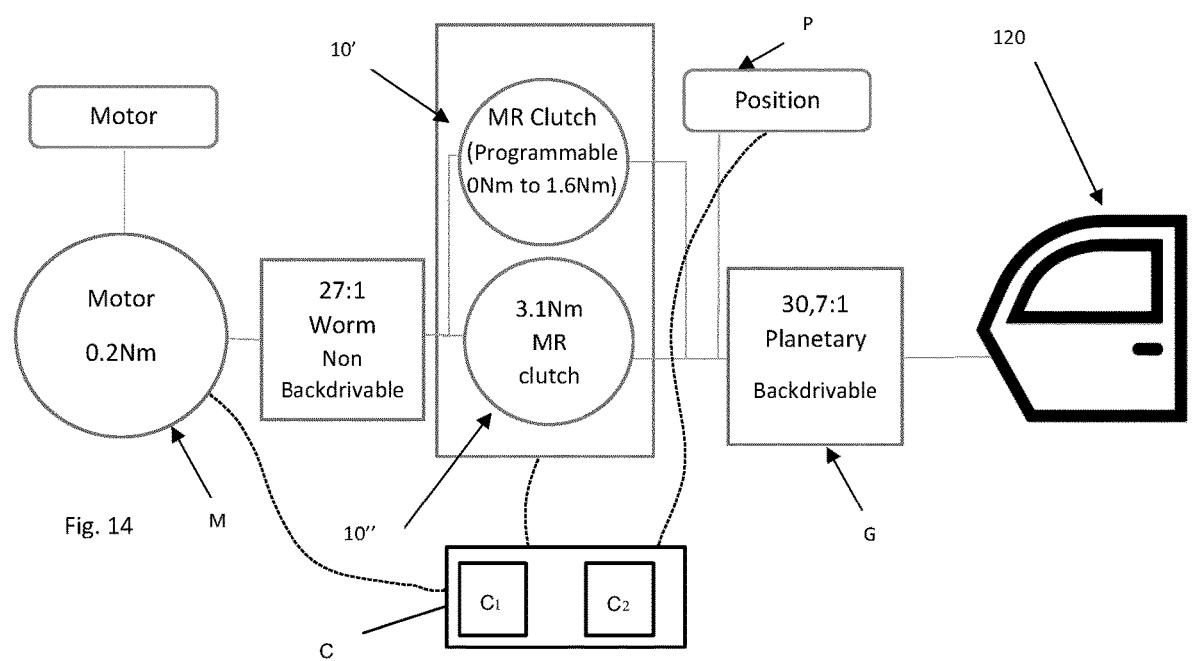
FIG. 14 is a schematic view of another system featuring MR fluid apparatuses as used with a vehicle door.

FIGS. 12 to 14 are exemplary embodiments of an application where the MR fluid clutch apparatuses of the present disclosure may be used, i.e., that is MR fluid clutch apparatuses (including MR fluid brake apparatuses) featuring magnetizable component(s) 31. In FIG. 12, the MR fluid clutch apparatus may be used to control the door opening force with high bandwidth as explained in PCT Application Publication No. WO2017083970. In parallel, a MR fluid clutch apparatus 70 may be used to brake the door 120 even if there is no power supplied to the MR fluid clutch/brake apparatuses 10 and 70. In this application, the MR fluid brake apparatuses may be programmed to output the required torque to maintain the door in a given position but to keep the force required to move the door to a low level if an external force is provided on vehicle door 120. When used in a first mode, such as an actuation mode, the motor M to which the MR fluid clutch apparatus 10 is coupled is activated and the MR fluid clutch apparatus 10 is maintained in slippage to control the amount of torque to the door 120. The MR fluid brake apparatus 70 is deactivated (programmed to 0 Nm). The clutch current in the coil 18 is electronically controlled to vary the force applied at the gearbox G with high bandwidth (>15 Hz). When the door 120 reaches the desired position measured by the position encoder P, the MR fluid clutch apparatus 10 ceases to transmit torque and the door stops. The resulting "holding torque" may be recorded. The motor M may slow down to a lower speed and the MR fluid clutch apparatus 10 may maintain the "holding torque". When an external force is applied to the door 120, such as by a human (or wind) pushing on the door 120, the door 120 may move immediately with very low external force. The door 120 may move with the MR fluid clutch apparatus 10 assisting. A torque sensor may be used but is not required. If the system needs to reduce its power consumption, the "holding torque" may be programmed in the MR brake 70 as explained earlier and the motor M and/or MR fluid clutch apparatus 10 may be deactivated. In this application, the motor of the system may be shut down, but the MR fluid brake apparatus 70 maintains the "holding torque" without power because the torque is braked on the structure, not on the back drivable motor. Such a second mode may be referred to as a holding mode (or set mode, or programmed mode) as the MR fluid brake apparatus 70 holds the door 120 using its remanent magnetization. When an external force such as human (or wind) pushes on the door 120, the door 120 may move immediately with very low force without requiring torque sensor. When the door 120 moves, the MR fluid clutch apparatus 10 may return to the actuation mode and the MR fluid brake apparatus 70 may be degaussed in the manner shown in FIG. 11 to have zero braking force programmed in the MR fluid brake apparatus 70. This last mode may be useful when the door of the vehicle is closed, and minimum braking force needs to be present not to restraint the manual door opening of the vehicle. To achieve this type of operation, a controller C may be connected to the various components of the system. The controller C may include one or more processing units C1, as well as non-transitory computer-readable memory C2 communicatively coupled to the processing unit C1 and comprising computer-readable program instructions executable by the processing unit for operating the system as described above. The controller C may include in the memory C2 a database including characteristics of the magnetizable component, such as graphs as in FIG. 7, FIG. 10' and FIG. 11, for the controller C to have the capacity to drive the electromagnet unit 18 to set a desired holding torque.

The controller C may therefore operate the system shown in FIG. 12, and in subsequent figures, or any of the MR fluid clutch apparatuses described herein, by varying an amount of torque transmission between a driving member and a driven member in the at least one magnetorheological fluid clutch apparatus by actuating at least one coil in the at least one magnetorheological fluid clutch apparatus in a first mode; in a second mode, causing torque transmission between the driven member and the driving member by setting a desired remanent magnetization level in a magnetic component of the at least one magnetorheological fluid clutch apparatus by actuating the at least one coil in the at least one magnetorheological fluid clutch apparatus; decelerating a torque source connected to the driving member in the second mode; stopping the torque source connected to the driving member in the second mode; in a third mode, varying an amount of torque transmission between the driving member and the driven member in the at least one magnetorheological fluid clutch apparatus by actuating the at least one coil in the at least one magnetorheological fluid clutch apparatus to a current level below a current level corresponding to that of the desired remanent magnetization level; removing the desired remanent magnetization level; varying an amount of torque transmission in the first mode when the driven member applies a force to displace a door; causing torque transmission between the driven member and the driving member when the driven member maintains the door in a desired position; and/or maintaining the door in a desired position by one said magnetorheological fluid clutch apparatus being a magnetorheological fluid brake apparatus.

FIG. 13 is another exemplary embodiment of a typical application where only MR fluid clutch apparatuses 10 may be used. This architecture differs from the architecture shown in FIG. 12 as a MR fluid clutch apparatus 10 is used instead of the MR fluid brake apparatus 70. In this application, the driving member 12 (not shown) of the MR fluid clutch apparatus may be connected to a non-backdrivable powertrain such that when not powered, the powertrain may not be rotated in relation to the chassis (not shown). In this application, MR fluid clutch apparatus 10 may be used to control the door opening force with lower bandwidth than the system of FIG. 12 because of the presence of the magnetizable component 31 (not shown) in the magnetic circuit. In this application, the MR fluid clutch apparatus 10 may be programmed to output the required torque to maintain the door in a given position, and to keep the force required to move the door to a low level if an external force is provided on vehicle door 120. When used in actuation mode, the motor is activated and the MR fluid clutch apparatus 10 is maintained in slippage to control the amount of torque applied to the door 120. The current in the coil 18 is electronically controlled to vary the force applied at the gearbox with average bandwidth (>1 Hz). When the door 120 reaches the desired position measured by the position encoder, the MR fluid clutch apparatus 10 ceases to transmit torque such that the door 120 stops. The resulting "holding torque" may be recorded. The motor may slow down to a low speed and the MR fluid clutch apparatus 10 may maintain the "holding torque" in the MR fluid clutch apparatus 10, in the holding mode. When an external force is applied to the door 120, such as by a human (or wind) pushing on the door 120, the door 120 may move immediately with very low force. The door 120 may move and the system may help movement. Torque sensor may be used but is not required. If the system needs to reduce its power consumption, the "holding torque" may be programmed or set in the MR clutch 10 as explained earlier and the motor and/or the MR fluid clutch apparatus 10 may be unpowered. In this application, the system may be shut down and MR fluid clutch apparatus 10 maintains the "holding torque" without power because the torque is braked on the non backdrivable motor. When human (or wind) pushes on the door 120, the door 120 may move immediately with very low force without requiring torque sensor. When the door 120 moves, the MR fluid clutch apparatus 10 may return to the actuation mode, be degaussed as explained in FIG. 11 to remove remanent magnetization. This last mode may be useful when the door of the vehicle is closed, and minimum braking force need to be present on the actuator not to restraint the manual door opening of the vehicle. At any moment, the current in the programmable clutch 10 may be controlled to adjust the transmissible torque. In a particular mode, a third mode, the MR fluid clutch apparatus may have be programmed with a remanent magnetization level, as in the holding mode, yet the electromagnet unit 18 may be driven to adjust the torque transmission, at a current lower than that corresponding to the holding torque.

FIG. 14 is another exemplary embodiment of a typical application where two variations of MR fluid clutch apparatuses 10' and 10" may be used. In this application, the MR fluid clutch apparatus 10" may be used to control the door opening force with high bandwidth as explained in WO2017083970. In parallel, the MR fluid clutch apparatus 10' may be used to offer a biasing force the door 120 even if there is no power supplied to the MR fluid clutch apparatuses 10' and 10". In this application, the MR fluid clutch apparatus 10' may be programmed with the required torque to maintain the door in a given position but to keep the force required to move the door to a low level if an external force is provided on vehicle door 120. When used in actuation mode, the motor M is activated and the MR fluid clutch apparatus 10" is maintained in slippage to control the amount of torque to the door 120 while a constant force (DC force) may be produced by the MR clutch apparatus 10'. This configuration may be useful where both a low bandwidth force is required in parallel with a high bandwidth force (AC force). Many applications may need this kind of force combination. As an example, the forces on any helicopter swash plate to control the inclination of the blades may benefit from this arrangement. In FIG. 14, both MR fluid clutch apparatus 10' and 10" may be connected to a common motor M, though separate motors could be used.

Figure 15:
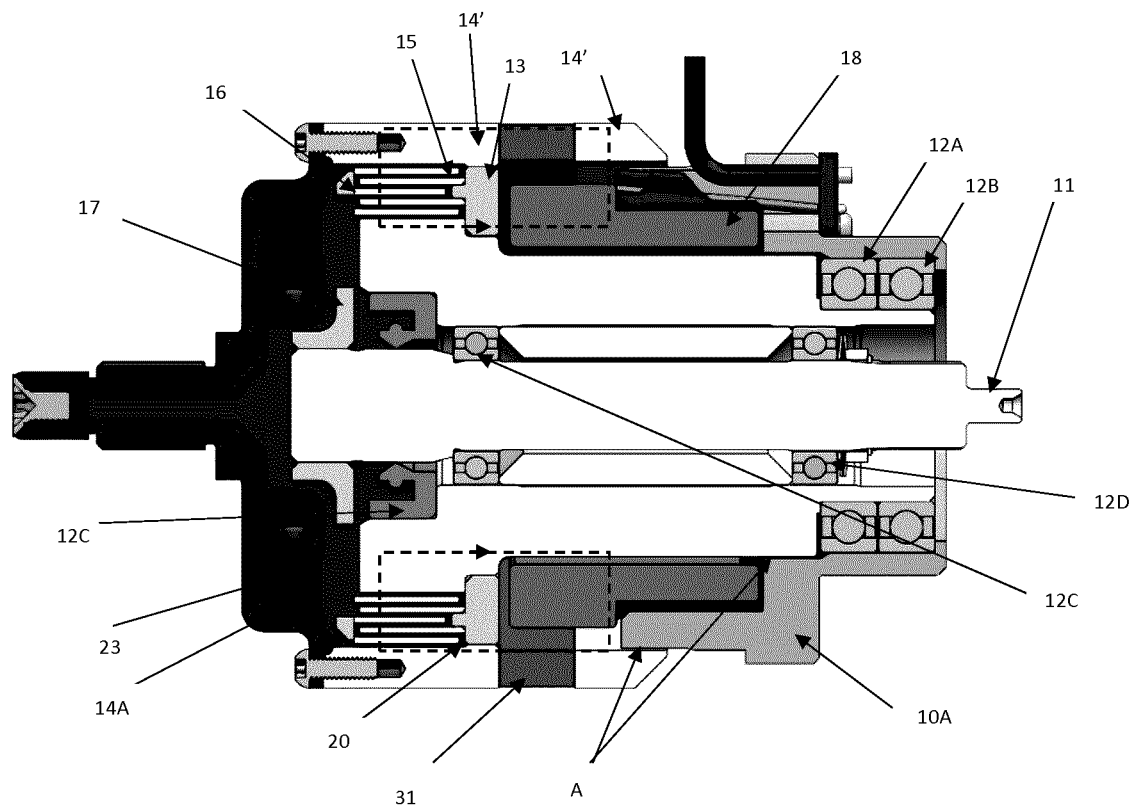
FIG. 15 is a sectioned schematic view of a MR fluid clutch apparatus in accordance with yet another embodiment.

FIG. 15 shows an embodiment similar to that of FIG. 4 with the difference that the output member 11, a.k.a., driven member, is located on the same side as the stator 10A. In addition of bearing 12A and 12B that are supporting the driving member 12 on the stator 10A, two bearings 12C and 12D are added to guide the driven member 11. The magnetizable component 31 may be at any of the locations as described in FIGS. 2 to 7, but is shown on the outer shell of the input rotor, for example in the form of a sleeve or ring.

The driving member 12 has an elongated tubular portion that is concentric with the output member 11, with the bearings 12C and 12D interfacing the tubular portion to the output member 11. As also observed, the drums 15 project from the support 13 toward the input end, while the drum 16 project from the support 17 toward the driven end. The support 13 projects radially inwardly from the shell of the input rotor 14.

Figure 16:
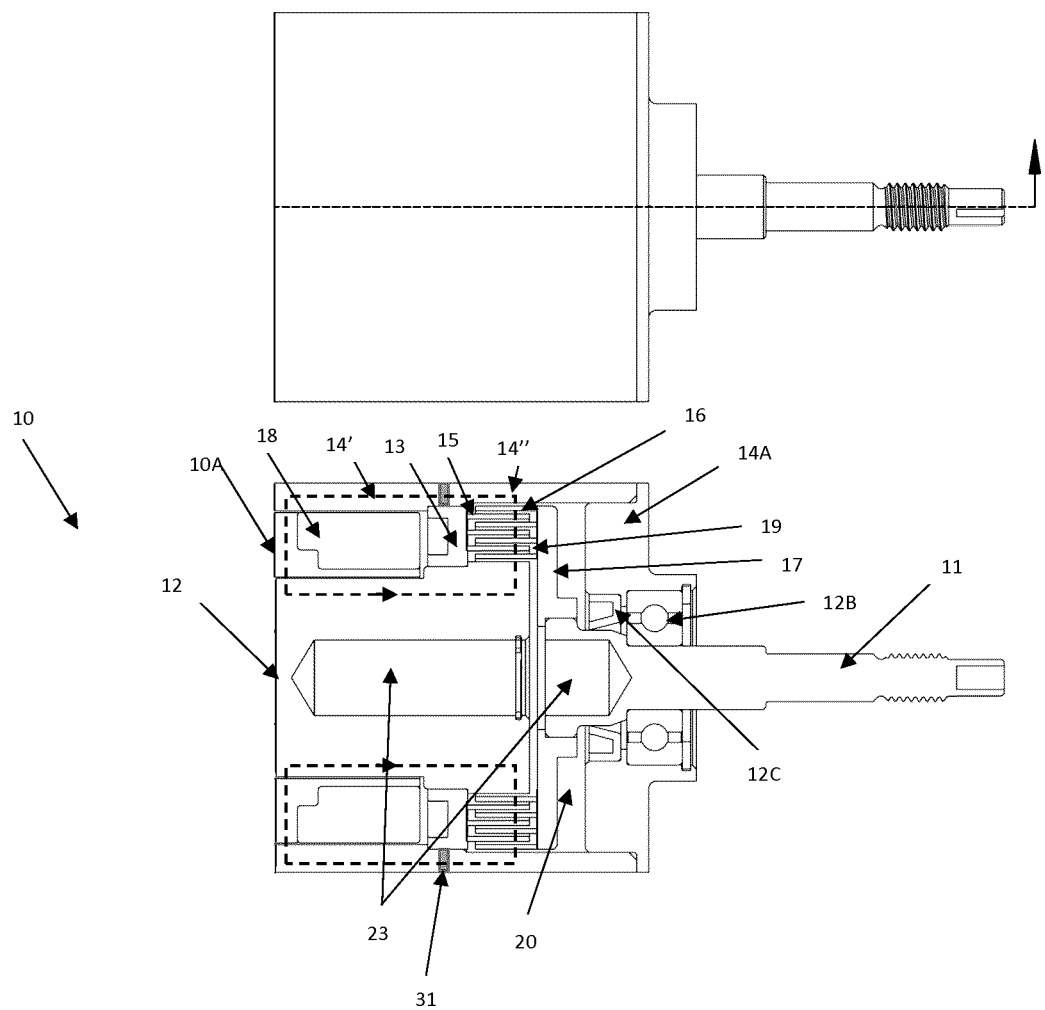
FIG. 16 is a sectioned schematic view of the MR fluid clutch apparatus of FIG. 1, in accordance with yet another embodiment.

FIG. 16 is a sectioned schematic view of the MR fluid clutch apparatus similar to the one of FIG. 4 with the difference that any of the components defines the input rotor 14 or driving member 12 is grounded to a structure. In this configuration, it is possible to slide the stator 10A out, along with the electromagnet unit 18. Stated differently, the stator 10A may be viewed as an adjustment cartridge that is installed in the MR fluid brake apparatus of FIG. 16, to set the holding torque. Once the remanent magnetization level is set, the stator cartridge is removed and the MR fluid brake apparatus of FIG. 16 remains in the holding mode. Such embodiment may be useful when a unit needs to be programmed only once in a while and where having an electromagnetic unit 18 and its associated wires during the application. This kind of embodiment may be useful in application where a programmable mechanical fuse may be required in a very dusty environment (e.g. construction) and where an electromagnetic unit 18 may be easily damaged.

What is claimed is:

1. A magnetorheological fluid clutch apparatus comprising:
    a driving member having at least one first shear surface, the driving member adapted to be coupled to a torque source;
    a driven member having at least one second shear surface opposite to the at least one first shear surface, the shear surfaces separated by at least one annular space, the driven member adapted to be connected to an output;
    magnetorheological (MR) fluid in an MR fluid chamber including the at least one annular space, the MR fluid configured to generate a variable amount of torque transmission between the driving member and the driven member when subjected to a magnetic field;
    at least one coil actuatable to deliver a magnetic field through the MR fluid; and
    at least one magnetizable component of the type maintaining a remanent magnetization level, the magnetizable component configured to be exposed to the magnetic field from the at least one coil to achieve remanent magnetization;
    wherein actuation of the at least one coil results in a variation of torque transmission between the driven member and the driving member,
    wherein the remanent magnetization level generates another magnetic field resulting in torque transmission between the driven member and the driving member, and
    wherein the torque transmission in the magnetorheological fluid clutch apparatus is operated by a single magnetic circuit generated from the magnetic field from the at least one coil and the magnetic field from the magnetizable component.

2. The magnetorheological fluid clutch apparatus according to claim 1, wherein the driving member and the driven member are rotatably connected a stator.

3. The magnetorheological fluid clutch apparatus according to claim 1, wherein the torque source is a motor.

4. The magnetorheological fluid clutch apparatus according to claim 1, wherein the torque source includes a structure providing braking power.

5. The magnetorheological fluid clutch apparatus according to claim 1, wherein the at least one magnetization component is annular.

6. The magnetorheological fluid clutch apparatus according to claim 5, wherein the at least one magnetization component is axisymmetric.

7. The magnetorheological fluid clutch apparatus according to claim 1, wherein the at least one magnetization component includes a plurality of discrete magnetization components circumferentially distributed in the magnetorheological fluid clutch apparatus.

8. The magnetorheological fluid clutch apparatus according to claim 1, wherein the at least one first shear surface is part of an input drum, and the at least one second shear surface is part of an output drum.

9. The magnetorheological fluid clutch apparatus according to claim 1, wherein the magnetizable component is made of AlNiCo.

10. A system comprising:
    at least one magnetorheological fluid clutch apparatus according to claim 1;
    a controller for operating the at least one coil.

11. The system according to claim 10, wherein the at least one magnetorheological fluid clutch apparatus is operatively connected to a door.

12. A system for operating at least one magnetorheological fluid clutch apparatus comprising:
    a processing unit; and
    a non-transitory computer-readable memory communicatively coupled to the processing unit and comprising computer-readable program instructions executable by the processing unit for:
    in a first mode, varying an amount of torque transmission between a driving member and a driven member in the at least one magnetorheological fluid clutch apparatus by actuating at least one coil in the at least one magnetorheological fluid clutch apparatus the at least one coil being fixed to a stator of the magnetorheological fluid clutch apparatus while the driving member and the driven member rotate, and
    in a second mode, causing torque transmission between the driven member and the driving member by setting a desired remanent magnetization level in a magnetic component of the at least one magnetorheological fluid clutch apparatus by actuating the at least one coil in the at least one magnetorheological fluid clutch apparatus.

13. The system according to claim 12, including decelerating a torque source connected to the driving member in the second mode.

14. The system according to claim 13, including stopping the torque source connected to the driving member in the second mode.

15. The system according to claim 12, including, in a third mode, varying an amount of torque transmission between the driving member and the driven member in the at least one magnetorheological fluid clutch apparatus by actuating the at least one coil in the at least one magnetorheological fluid clutch apparatus to a current level below a current level corresponding to that of the desired remanent magnetization level.

16. The system according to claim 12, including removing the desired remanent magnetization level.

17. The system according to claim 12, wherein varying an amount of torque transmission in the first mode is performed when the driven member applies a force to displace a door.

18. The system according to claim 17, wherein causing torque transmission between the driven member and the driving member is performed when the driven member maintains the door in a desired position.

19. The system according to claim 18, wherein the driven member maintains the door in a desired position by one said magnetorheological fluid clutch apparatus being a magnetorheological fluid brake apparatus.

20. A magnetorheological fluid clutch apparatus comprising:
- a driving member having at least one first shear surface, the driving member adapted to be coupled to a torque source;
- a driven member having at least one second shear surface opposite to the at least one first shear surface, the shear surfaces separated by at least one annular space, the driven member adapted to be connected to an output;
- a stator rotatably supporting the driving member and the driven member, the stator forming a casing of the magnetorheological fluid clutch apparatus;
- magnetorheological (MR) fluid in an MR fluid chamber including the at least one annular space, the MR fluid configured to generate a variable amount of torque transmission between the driving member and the driven member when subjected to a magnetic field;
- at least one coil actuatable to deliver a magnetic field through the MR fluid; and
- at least one magnetizable component of the type maintaining a remanent magnetization level, the magnetizable component configured to be exposed to the magnetic field from the at least one coil to achieve remanent magnetization;
- wherein actuation of the at least one coil results in a variation of torque transmission between the driven member and the driving member,
- wherein the remanent magnetization level generates another magnetic field resulting in torque transmission between the driven member and the driving member, and
- wherein the at least one coil and the at least one magnetizable component are part of the stator.

\* \* \* \* \*